SIGNAL COMPRESSION AND EXPANSION SYSTEM

Filed Oct. 9, 1967 4 Sheets-Sheet 1

INVENTORS
THOMAS G. STOCKHAM. JR.
ALAN V. OPPENHEIM
BY, Robert T Dunn
ATTORNEY

SIGNAL COMPRESSION AND EXPANSION SYSTEM

Filed Oct. 9, 1967 4 Sheets-Sheet 2

A< 1.0 SIGNAL COMPRESSION
A> 1.0 SIGNAL EXPANSION
τ= 1/2 fc

INVENTORS
THOMAS G. STOCKHAM, JR.
ALAN V. OPPENHEIM
BY Robert T. Dunn
ATTORNEY

June 30, 1970 A. V. OPPENHEIM ET AL 3,518,578

SIGNAL COMPRESSION AND EXPANSICN SYSTEM

Filed Oct. 9, 1967 4 Sheets-Sheet 3

INVENTORS
THOMAS G. STOCKHAM, JR.
ALAN V. OPPENHEIM
BY, Robert T Dunn
ATTORNEY

INVENTORS
THOMAS G. STOCKHAM, JR.
ALAN V. OPPENHEIM
BY

United States Patent Office 3,518,578
Patented June 30, 1970

3,518,578

SIGNAL COMPRESSION AND EXPANSION SYSTEM

Alan V. Oppenheim, Arlington, and Thomas G. Stockham, Jr., Lexington, Mass., assignors to Massachusetts Institute of Technology, Cambridge, Mass., a corporation of Massachusetts Filed Oct. 9, 1967, Ser. No. 673,740
Int. Cl. H04b *1/64*
U.S. Cl. 333—14 11 Claims

ABSTRACT OF THE DISCLOSURE

The dynamic range of a complex input signal is compressed or expanded by first converting the complex input signal into the logarithm thereof, altering the amplitude relationship between different frequency components of the converted complex signal and converting the altered converted complex signal into a signal which is the anti-logarithm thereof. The manner in which the different frequency components of the converted complex signal are altered determines whether the final anti-logarithm signal is a compressed or expanded equivalent of the input signal.

The invention herein described was made in the course of work under Contract AF19 (628)-5167 with the Department of Defense.

This invention relates to signal compression and expansion systems whereby the dynamic range of a complex input signal is compressed or expanded as desired, to gain advantages in the transmission and reception of the signal.

Heretofore, a system generally referred to as a compandor system has been employed in telephone systems. The compandor is characterized by a compression of complex audio signals, followed by an expansion to achieve noise reduction by the so-called compandor action, the compression being applied before and the expansion being applied after the signal is exposed to noise. Compression here means that the effective gain which is applied to the complex signal varies as a function of the magnitude of the signal, the effective gain being greater for small signals than for large signals. In the process of expansion, on the other hand, the effective gain varies as a function of signal, but is greater for large than for small signals. As a rule, the compression and expansion actions complement each other; what one does, the other reverses. If the compressor inserts amplification in the transmission channel therebetween, the expander inserts an equal attenuation.

One object of the present invention is to provide a signal compression and expansion system for use in the transmission and receiving of audio signals such as human voice.

One type of compandor system employes a push-pull amplifier for which input impedance is controlled by a signal roughly proportional to the envelope of speech energy derived from a nonlinear circuit. Thus, the gain in the compressor is proportional to the envelope of a syllable of the speech pattern.

This syllabic type compandor system has improved telephone operation by providing substantial noise advantage. The reason for this is that the weak voice signals are most susceptible to degradation by noise and the strong voice signals are less susceptible to degradation by noise. Accordingly, in the syllabic system, the weak signals are highly amplified in the compressor and are carried at a relatively high level through the noise exposure, whereas, the stornger signals are amplified less highly. In the expander, on the other hand, where there is generally no noise exposure, more signal loss is inserted as the signal decreases and accordingly the noise picked up during noise exposure decreases correspondingly. The syllabic compandor is tailored to unique characteristic of voice signals.

Another type of compandor, sometimes called the instantaneous compandor samples the complex speech waveforms at a rate substantially higher than the syllabic rate of speech, and so the speech pattern is converted into a series of amplitude modulated pulses (PAM), and these pulses are amplitude compressed without regard for the syllabic envelope. Both of these types of compandors, the syllabic type and the instantaneous type provide a form of automatic volume control (AVC). In the first case, it is the syllabic envelope and in the second it is the pulse sample magnitude. In addition, both of these types of compandors require a bandwith for tarnsmission from the compressor to the expander, which is at least as great as the bandwidth of the complex signal entering the compressor. In some cases, the instantaneous compandor requires no more bandwidth for compression than the bandwidth of the input complex signal. However, for other practical reasons, instantaneous compandors cannot be employed with existing types of single sideband carrier systems.

It is another object of the present invention to provide a signal compression and expansion system in which no feedback type AVC is necessary for effective operation of the system.

It is another object of the present invention to provide such a system which does not require detection of the envelope of the input signal.

It is another object of the present invention to provide a signal compression and expansion system in which the range of variation of transmitted power may be reduced.

It is another object of the present invention to provide a signal compression and expansion system in which transmission is accomplished employing a single sideband transmission system having substantial advantages over prior systems.

Single sideband transmission systems transmit a single sideband of a carrier signal modulated by a complex input signal, the other sideband and the carrier being suppressed. When such systems are employed to transmit certain types of complex input signals, such as human speech, the transmission power varies widely, even within the interval of a single syllable of the human speech.

It is another object of the present invention to provide a signal compression and expansion system for use with a single sideband transmission system, such that complex input signals such as human speech can be transmitted at substantially steady transmitter power.

In accordance with embodiments of the present invention, the complex input signal, such as a human's speech, is considered to be the product rather than the sum of a multitude of different components. The processing of this input signal is based upon the components, of which the signal is a product. The components are each subject to a different amount of amplification or attenuation, and so the components are altered differently. The product of these altered components then comprises the compressed signal. In one embodiment, the different components are separated by taking the logarithm of the input complex signal and feeding the results into separate channels, each passing a different band of frequencies. Thus, amplitude compression is accomplished based upon groups of the different components, whose product forms the input complex signal. The system does not employ any AVC and so it does not operate as the syllabic compandor systems, known in the prior art. Furthermore, amplification in the compressor is not based upon the amplitude of the envelope of the input complex signal; it is based upon the amplitudes of components whose product is the input complex signal.

When such a compression system is employed in conjunction with an expander of the same type, the channel in the compressor includes a filter of predetermined gain and an equivalent channel in the expander includes the inverse of the same filter. Thus, the gain of the channel in the compressor is the reciprocal of the gain of the corresponding channel in the expander. In this manner, the expander does the opposite of the compressor. In one embodiment, the corresponding compressor and expander channels are identical and include identical linear phase filters in series with adjustable gain amplifiers. The gains of these amplifiers are set at equal values, but of opposite sign in the corresponding channels.

Other features and objects of the invention will be apparent from the following specific description taken in conjunction with the figures, in which:

FIG. 1 is a block diagram illustrating principal parts of a multi-channel compressor or expander circuit, incorporating features of the present invention;

FIGS. 2*a* to 2*h* illustrate waveforms to demonstrate principals of the invention involved in producing the compressed signal shown in FIG. 2*h*;

FIG. 3 illustrates signal compression and expansion systems at different locations with transmitting and receiving systems coupling them;

FIGS. 4*a* and 4*b* illustrate amplitude and phase characteristics of the channel filter in the compressor section of FIG. 3;

FIGS. 5*a* and 5*b* illustrate amplitude and phase characteristics of the inverse channel filter in the expander section of FIG. 3;

The present invention stems in part from the observation that any complex signal, such as human speech, can be expressed as the product of a number of different components. This being the case, the various components can be separated by taking the logarithm of the input complex signal and feeding the logarithm into a plurality of channels, such that the channels separately process different components whose product makes up the complex input signal. More particularly, the components are amplified or attenuated in a predetermined manner and then are recombined by simply adding. Then the antilog of the summation or combined channel output is taken and the algebraic sign of the initial input signal is reinserted, so that the initial input signal is reformed in an expanded or compressed state. Quite clearly, this compression is not amplitude compression in the ordinary sense, employed and accomplished in the past, because it is not based on the detection of an input signal envelope. The amplification or attenuation of each of the frequency components is not based upon the amplitude of each component, but is a predetermined factor and may result generally in amplitude compression or expansion. For example, it is found that when the complex input signal is audio that the low-frequency product components, which make up the audio and which are separated out by the channels, can be very substantially attenuated relative to the high frequency product components and yet will result in very little final distortion or decrease in intelligibility of the compressed audio. Furthermore, numerous advantages are achieved by doing this and some of these will be discussed herein below.

The foregoing describes embodiments of the invention wherein the components are separately processed in a plurality of channels. The same effects can be accomplished employing a single channel equipped to amplify or attenuate in varying amounts at different frequencies.

The same features of the present invention used to compress the complex input signal are also used to expand it, and in fact the identical circuits can be used both to compress and to expand; the attenuation or amplification in the corresponding channels is merely changed. Accordingly, a system is formed employing features of the present invention, for compressing a signal, transmitting the compressed signal, receiving the transmitted signal and expanding it into its original form. In such a system, numerous advantages are gained in both the transmission and receiving equipments and these advantages follow directly from the type of compression and expansion featured in the invention.

Figure 1:
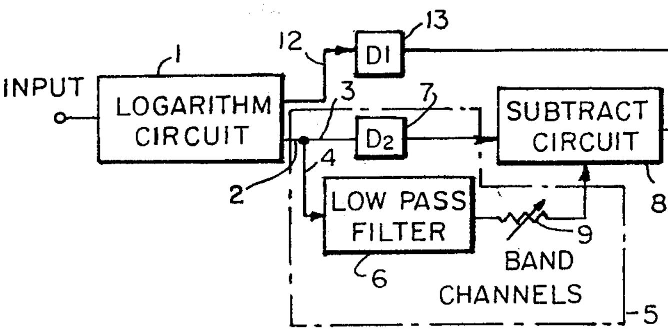

Turning first to FIG. 1, there is shown a block diagram illustrating the basic components of a simple circuit for compressing a complex input signal in accordance with features of the present invention. The complex input signal which may be human speech is denoted input and is fed to a logarithm circuit 1. The excursions of the input signal appear in the output of the logarithm circuit 1, also as excursions, but of amplitude proportional to the logarithm of the corresponding excursions of the input to the circuit. This output 2 is fed into one or more channels, such as 3 and 4 designated band channels 5.

At least one of the band channels (channel 4) includes a filter 6, so that the signals which pass through the channel 4 constitute a substantially different frequency band than signals which pass through channel 3. In addition, one or both of the channels may include delays of predetermined value, such as delay 7, by which the relative phase of the signals in each channel are maintained the same, so that upon subtracting the outputs of the channels in a circuit 8, certain phase relationships between frequency signals in the different channels are maintained. In addition, one or both of the channels includes means such as 9 for amplifying or attenuating the frequency signal therein and this amplification or attenuation may be adjustable or fixed at a predetermined value.

Thus, the outputs of the two channels, 3 and 4, are fed to the subtract circuit 8, wherein they are combined and fed to antilog circuit 11. Antilog circuit 11 also receives a sign signal from a third channel 12, which is a signal representative of the algebraic sign of the excursion of the complex input signal fed to a logarithm circuit 1. This third channel also contains a predetermined delay 13, so that the sign signal fed to the antilog circuit 11 is in the proper phase synchronism with the output from subtract circuit 8.

The antilog circuit 11 takes the antilog of the output of the subtract circuit 8 and reinserts the proper sign of the complex signal. As a result, the output of the antilog circuit 11 is the compressed form of the complex input signal. Thus, the circuit in FIG. 1 operates as a compressor. Operation as an expander is achieved by, for example, merely replacing subtract circuit 8 with an add circuit or by inverting phase in channel 4.

Figure 2A:
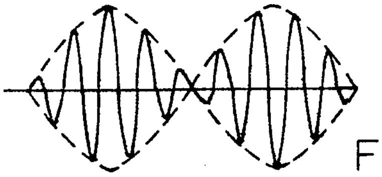
Figure 2C:
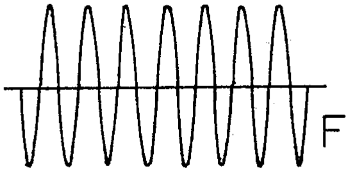
Figure 2B:
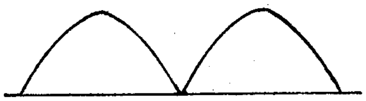
Figure 2E:
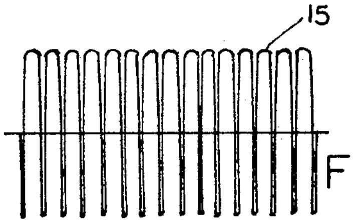
Figure 2D:
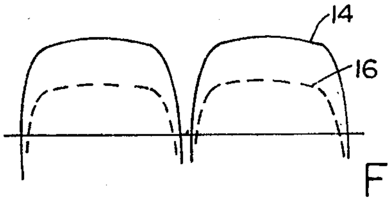

The operation and functioning of the circuit in FIG. 1 is illustrated by the function diagram shown in FIGS. 2*a* to 2*h*. For example, FIG. 2*a* illustrates the complex input waveform which is the product of two frequency components, a low-frequency component in FIG. 2*b* and a high-frequency component in FIG. 2*c*. The logarithm of the low-frequency product component is illustrated by the curve 14 in FIG. 2*d* and the logarithm of the high-frequency product component is illustrated in FIG. 2*e* as curve 15. These logarithm curves 14 and 15 are not necessarily identical with waveforms electrically produced in the output 2 of the logarithm circuit 1; they are plots of the logarithm of the absolute value of excursions of the low- and high-frequency components and do not indicate algebraic sign (phase) of the components.

The electrical equivalents of these logarithm curves 14 and 15 are fed to each of the channels 3 and 4. In channel 3, they are both coupled without alteration to the subtract circuit 8 and in channel 4 only the low-frequency component logarithm is passed and this is subject to a predetermined attenuation or amplification before being fed to the subtract circuit. Thus, the low-frequency component logarithm in channel 4 is reduced, as represented by curve 16 in FIG. 2*d*, and the high-frequency component logarithm therein remains substantially unchanged in the output of subtract circuit 8.

Figure 2F:

FIG. 2*f* illustrates the summation of the logarithms of the high- and low-frequency components (curves 14 and 15) and represents the signal in channel 3. FIG. 2*g* illustrates the summation of logarithm curves 15 and 16 and represents the output of subtract circuit 8.

Figure 2H:
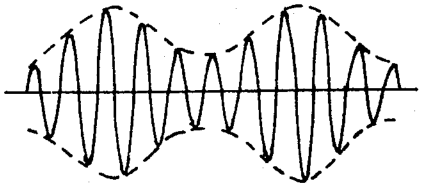
Figure 2G:

The antilog circuit 11 takes the antilog of the waveform 2*g* and inserts the proper algebraic sign from channel 12 in the proper phase sequence maintained by the delay 13, to reconstruct in compressed form the initial complex signal, as shown in FIG. 2*h*.

A comparison of FIGS. 2*h* and 2*a* shows the effects of signal compression. Clearly, the dynamic range of the complex input signal is decreased in a controlled manner with no loss in information content. This reduction in dynamic range without loss in information content substantially aids soft sounds, particularly when exposed to sounds which tend to mask them. Thus, advantageous use of such a compressor may be had in microphone interview systems, hearing aids, intercom systems and the like.

The system described in FIGS. 1 and 2 gains particular advantage when used in conjunction with radio transmission systems. Ordinarily, when a carrier signal is modulated by speech and transmitted by a radio transmission system, the transmitted power ranges widely from syllable to syllable and even ranges substantially within a single syllable of the speech. However, when a compressed complex signal such as described in FIGS. 1 and 2 is employed to modulate the radio transmission system, substantially the same intelligence is transmitted, but at steadier transmitter power.

Another use of the compression described above may be had at the receiver of a radio transmission-receive system. At the receiver, the complex signal is compressed to decrease the dynamic range of fluctuations introduced in the transmission path between the transmitter and receiver. Thus, in this use the compressor provides some of the effects of AVC, even in situations where conventional AVC cannot be used, such as in single sideband transmission-receive systems.

Signals can be compressed 100%, in the manner shown in FIGS. 1 and 2, and still the resulting compressed signal is intelligible. A high degree of compression can be accomplished for purposes of transmission, and then the received signal can be expanded employing the same type of circuit illustrated in FIGS. 1 and 2, to expand the received signal into its original form with full intelligibility provided the compression is short of 100%.

Figure 3:
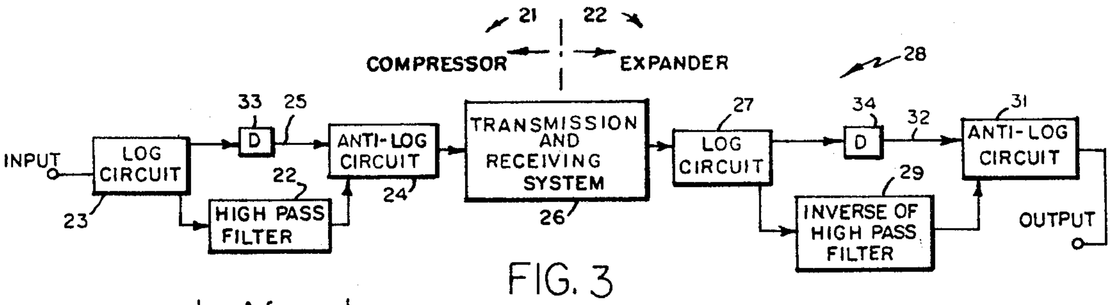

FIG. 3 is a block diagram illustrating compression and expansion circuits, linked by a transmitting and receiving system. The compression system 21 in FIG. 3, as well as others described herein, is capable of accomplishing nearly 100% compression. In FIG. 3, there is not a plurality of frequency channels, as in FIG. 1, but only a single high-pass filter 22 coupling the output of the logarithm circuit 23 to the antilog circuit 24 and this filter passes some low-frequency components. The antilog circuit 24 responds also to a signal in channel 25 which represents the algebraic sign of the input signal. The output of the antilog circuit 24 is fed to a transmitter which transmits to a receiver, all identified as the transmission and receiving system 26, and the output of the receiver is fed to log circuit 27 in the expander system 28. The output of log circuit 27 is fed to a filter 29, which is the inverse of the high-pass filter 22 in the compressor system 21. The output of the filter 29 is fed to antilog circuit 31, along with the signal in sign channel 32 for reconstructing the antilog thereof. This antilog which appears at the output is substantially identical to the complex input signal fed to the compressor system.

Each of the sign channels 25 and 32 includes a suitable delay such as 33 and 34 respectively. These delays are such that the sign signals are fed in proper phase relative to the associated filter outputs to the antilog circuits. If filters 22 and 29 are zero delay filters, these delays 33 and 34 may be omitted.

Figure 4:
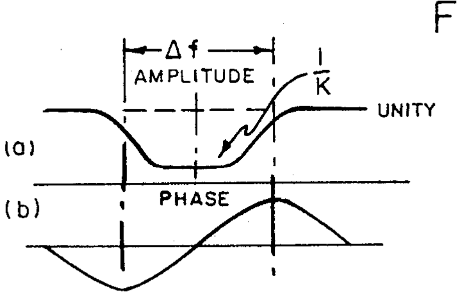
Figure 5:
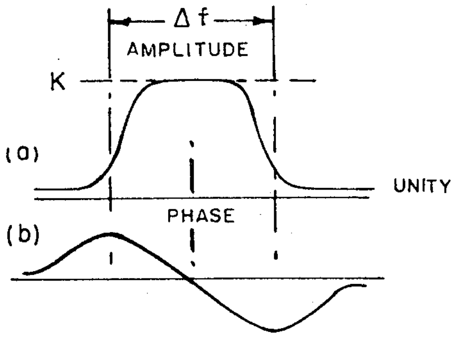

The high-pass filter 22 in the compressor system and filter 29 in the expander system of FIG. 3 are designed so that they complement each other. That is to say, the amplitude-frequency characteristics of one complements the amplitude-frequency characteristics of the other, and the phase-frequency characteristics of one complements the phase-frequency characteristics of the other. These characteristics are illustrated in FIGS. 4*a* and 4*b*, and FIGS. 5*a* and 5*b*. FIG. 4*a* is a plot of amplitude vs. frequency of high-pass filter 22 in the compressor system. FIG. 5*a* is a similar plot for filter 29 in the expander system. The bands $\Delta f$ of these filters are the same. Filter 22 attenuates frequencies in this band by the factor $1/k$ and filter 29 amplifies frequencies in this band by the factor $k$.

For the sake of simplicity, the filters 22 and 29 may exhibit a substantial variation in phase shift with frequency across the band $\Delta f$, in which case the frequency-phase shift characteristics of the filters 22 and 29, shown in FIGS. 4*b* and 5*b*, must be substantially equal and opposite, so that the latter cancels the effects of the former. This requirement is eliminated if the filters are linear phase-shift filters; however, this is sometimes difficult to accomplish and in most cases is not worth the effort, since the complementary phase characteristics are so readily obtained.

Figure 6:
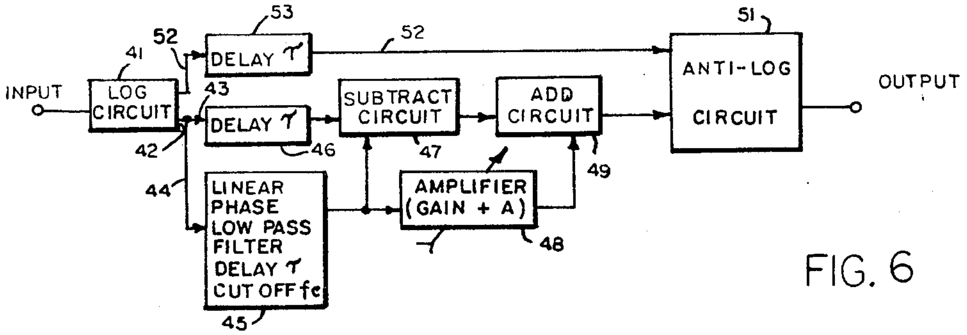
FIG. 6 is a block diagram illustrating the parts of a circuit which can be used either as a compressor or expander.

Turning next to FIG. 6, there is shown a circuit which can be employed as a compressor circuit or as an expander circuit, depending upon the adjustment of gain in one of the channels. This circuit includes a logarithm circuit 41 which responds to the complex input signal. The output 42 of the logarithm circuit is fed to two channels, 43 and 44. Channel 44 includes a linear phase low-pass filter 45 of fixed delay $\tau$ and fixed cutoff frequency $f_c$. Channel 43 includes a fixed delay $\tau$ denoted 46. The output of filter 45 is subtracted from the output of delay 46 in circuit 47 and so the output of subtract circuit 47 is substantially the same as the output 42 from logarithm circuit 41 but with low-frequencies removed.

When the circuit in FIG. 6 is employed as a volume compressor circuit, the output of filter 45 is amplified by adjustable gain amplifier 48, having a gain A, which is less than unity and the output thereof is added to the output of subtract circuit 47 in add circuit 49. Thus, when the system is employed for signal compression, the logarithm of the complex input signal appearing in the output 42 of logarithm circuit 41 is reduced by a fraction of the output from the linear filter 45, depending upon the gain setting of the adjustable gain amplifier 48.

On the other hand, when the circuit in FIG. 6 is employed as a signal expansion circuit, the gain of the amplifier 48 is set so that A is greater than unity, in which case more of the output from the filter 45 is added to the logarithm of the complex signal appearing in the output of logarithm circuit 41 than is subtracted therefrom.

In either application, the output of add circuit 49 is fed to antilog circuit 51 along with a signal in channel 52 from the logarithm circuit 41, which is indicative of the algebraic sign of the complex input signal. Channel 52 includes a fixed delay $\tau$, 53, which is equal to the delay 46. Antilog circuit 51 restores the complex signal in its original form, but in a compressed or expanded condition depending upon the setting of the adjustable gain amplifier 48.

Figure 7:
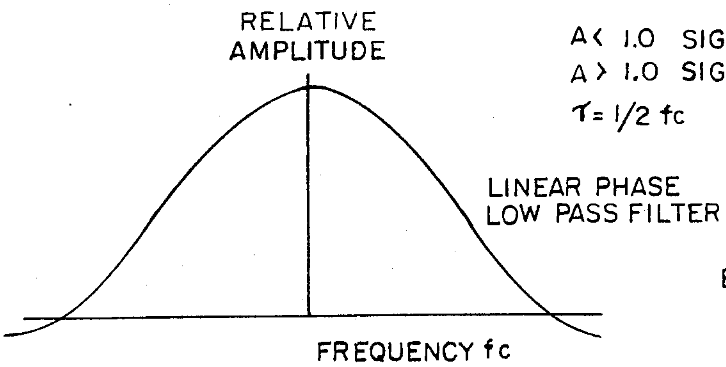
FIG. 7 shows the amplitude characteristics of the filter used in FIG. 6.

FIG. 7 is the plot of the amplitude frequency characteristic of linear phase low-pass filter 45, showing the cutoff characteristic of this filter near the frequency $f_c$. The delay $\tau$ of such a filter, as is well-known in the art, is approximately equal to $\frac{1}{2}f_c$.

Figure 8:
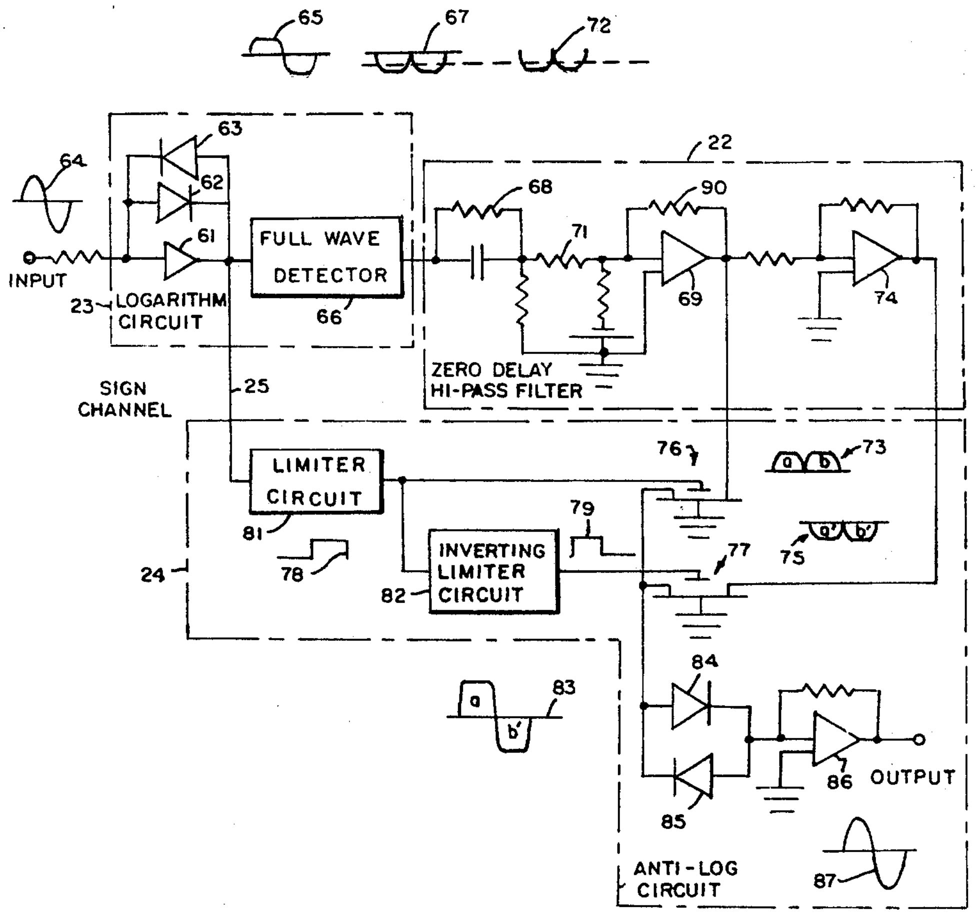
FIG. 8 is a detailed circuit diagram showing one form of the compression (or expansion) circuit.

Turning next to FIG. 8, there is shown a detailed circuit diagram of the compressor system 21, shown in FIG. 3. This system includes a single filter between the log circuit 23 and antilog circuit 24, in addition to the channel 25, which carries the algebraic sign of the complex input signal. Thus, the circuit in FIG. 8 can be designed to accomplish compression. In FIG. 8, the antilog circuit 24 includes means for inserting the algebraic sign by detecting algebraic sign in the logarithmic circuit 23. The high-pass filter 22 produces logarithm signals which are gated in the antilog circuit 24 by gates which respond to the sign of the initial signal, thereby reinstating the sign of the input signal.

The system in FIG. 8 includes the logarithm circuit 23, consisting of an operational amplifier 61 with oppositely directed semiconductor junction devices 62 and 63 in the feedback thereof. This amplifier responds to an input signal such as illustrated by the waveform 64, producing an output signal illustrated by waveform 65, the excursions in waveform 65 being related to the excursions in waveform 64 by the logarithm function. The output of the amplifier 61 is fully rectified by the rectifier 66 producing the waveform 67, which is fed to the high-pass filter 22.

The filter 22 here includes an RC circuit 68 coupled to an operational amplifier 69 by a coupling circuit 71, all of which combine to produce the filter characteristics such as shown in FIGS. 4*a* and 4*b*. The output of coupling circuit 71 is illustrated by the waveform 72, which is waveform 67 with low-frequency functions attenuated and suitably biased to provide the input to amplifier 69. The output of the amplifier 69 is illustrated by the waveform 73. In this embodiment, the high-pass filter also includes a second operational amplifier 74 having unity gain for producing the negative of the waveform 73 represented by the waveform 75.

The logarithmic waveforms 73 and 75 are gated by field effect transistor (FET) gates 76 and 77 respectively, which are controlled by gating pulses 78 and 79 respectively, derived from the output of the logarithm operational amplifier 61. For this purpose, limiter circuit 81 and inverting limiter circuit 82 are coupled with the output of the logarithm circuit operational amplifier 61. Thus, limiter circuit 81 produces the waveform 78 for controlling FET gate 76 and limiter 82 produces the waveform 79, controlling the FET gate 77.

The outputs of the FET gates 76 and 77 are combined to produce the waveform 83, which is the same as waveform 65, but with low-frequency components substantially removed. This logarithm waveform 83 is coupled via parallel oppositely directed semiconductor junction devices 84 and 85 to operational output amplifier 86 in the antilog circuit. These junction devices and the operational amplifier combine to take the antilog of the waveform 83, producing in the output thereof the waveform 87 which is the compressed equivalent of the input waveform 64. Thus, the detailed circuit described in FIG. 8 provides a compressed output signal which may be transmitted to a receiver location wherein the received signal is expanded. The circuit for expanding the received signal may be very similar to that shown in FIG. 8, but in which the characteristics of the high-pass filter 22 are inverted. This can be accomplished by a suitable rearrangement of the circuits surrounding operational amplifier 69, and specifically the circuits 68, 71 and resistor 90, according to established techniques.

Figure 9:
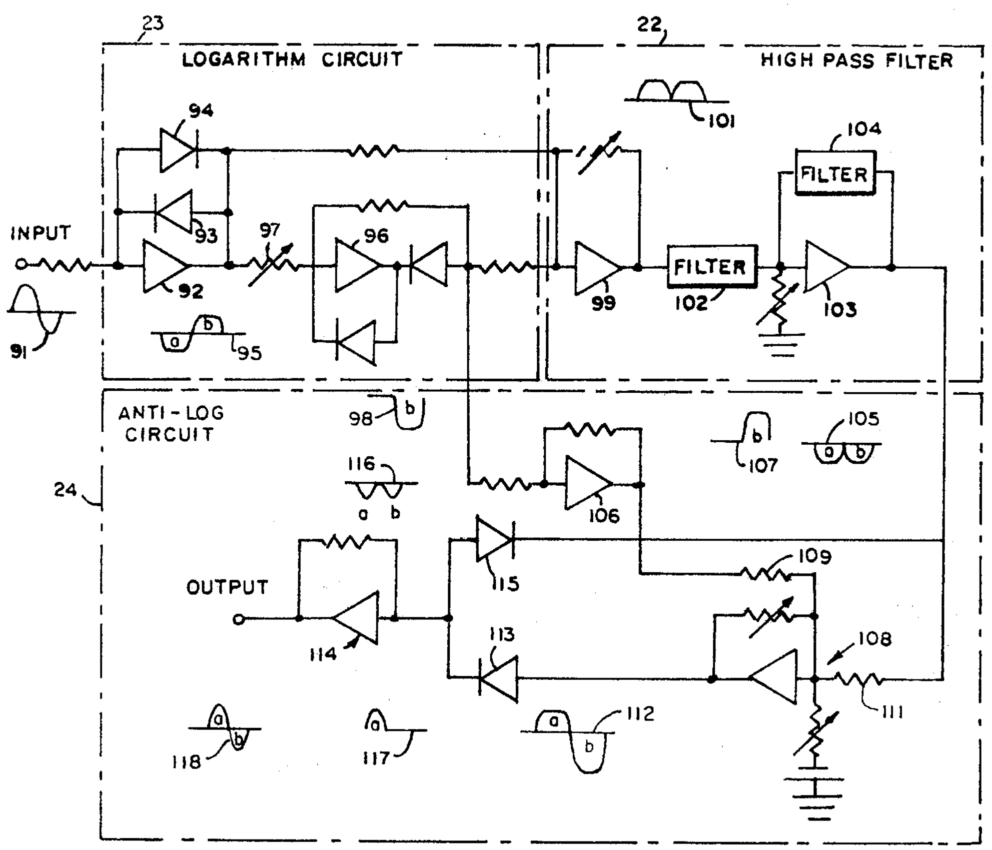
FIG. 9 is another circuit diagram of a signal compressor or expander circuit.

FIG. 9 illustrates in detail another circuit which is suitable for use as compression system 21 in FIG. 3. Here, a half wave bias switching technique is used for inserting the algebraic sign in the antilog circuit, rather than the gates employed in the system in FIG. 8. In FIG. 9, the input waveform 91 is fed to the logarithm circuit 23, which includes an operational amplifier 92, having oppositely directed semiconductor junction devices 93 and 94 in the feedback circuit thereof. The output of the amplifier 92, illustrated by waveform 95 is coupled to a second operational amplifier 96 by an adjustable resistance 97. This second amplifier includes uni-directional feedback so that its output, represented by waveform 98, includes but one amplified excursion, *b*, of its input, which in the example shown is the second excursion of the input signal.

The waveform output 98 is coupled, along with the waveform 95 to the input of adjustable feedback amplifier 99, and so the output of amplifier 99 is as illustrated by the waveform 101. This output is coupled by filter circuit 102 to amplifier 103, having a feedback filter 104, the combined filter characteristics of circuits 102 to 104 being as illustrated in FIGS. 4*a* and 4*b*, and producing the filtered phase-inverted waveform 105.

In the antilog circuit 24, waveform 98 is inverted in phase by operational amplifier 106, producing the waveform 107, and waveforms 107 and 105 are fed to summing amplifier 108 via input resistors 109 and 111, respectively, which weigh these input waveforms so that there is produced in the output of amplifier 108 the waveform 112. Thus, the first excursion *a* of waveform 112 represents the logarithm of the first excursion *a* of waveform 91, reduced by the low-frequency components which make up that excursion of the initial waveform 91. The second excursion *b* of waveform 112 represents the negative excursion of input waveform 91 and serves only to cut off the current in semiconductor junction device 113. The excursions *a* and *b* of waveform 105 represent the logarithm of both excursions of waveform 91 reduced by the low-frequency components thereof. These waveforms 105 and 112 are fed to the antilog summing circuit 114, consisting of oppositely directed input semiconductor junction devices 115 and 113, for coupling the waveforms 105 and 112 respectively to operational amplifier 114. The junction devices 115 and 113 deliver the antilog of waveforms 105 and 112, as represented by the waveforms 116 and 117 respectively, to the input of the operational amplifier 114. Thus, the output of the operational amplifier is the compressed equivalent waveform 118 of the input waveform 91.

The circuit in FIG. 9 is a signal compression circuit and can function in substantially the same manner to perform signal expansion by merely changing the characteristics of the filters 102 and 104, so that the high-pass filter 22 exhibits overall characteristics such as shown in FIGS. 5*a* and 5*b*.

This completes description of a number of embodiments of the present invention of methods and means for compressing and/or expanding the volume of typical complex input signals by taking the logarithm of the input signal to produce a summation of frequency components whose product is the input signal, then imposing different attenuation and/or amplification upon these different frequency components, and then taking the antilog of the result to produce a compressed or expanded equivalent of the initial input signal. These and other features of the invention described in various of the embodiments and advantageous use of the invention described herein are made by way of example and various adaptations and modifications may be made. The scope of the invention is set forth in the accompanying claims.

What is claimed is:

1. A system for changing the dynamic range of an input signal to produce an output signal of altered dynamic range which corresponds to said input signal comprising, a source of input signal, means for converting said input signal into the logarithm thereof, means including filter means responsive to the output of said converting means for altering the amplitude relationship between different components of said logarithm signal, means for converting said altered logarithm signal into a signal which is the anti-logarithm thereof, said anti-logarithm signal being said output signal, and means for transmitting said output signal, said means for altering amplitude relationship causing the lower frequency components of said logarithm signal to be smaller relative to the higher frequency components thereof, thereby compressing the dynamic range.

2. A system as in claim 1 and in which, said input signal consists substantially of audio frequencies.

3. A system as in claim 1 and further including, a transmission system for transmitting said anti-logarithm signal whereby the transmission power level of said transmission system is relatively steady.

4. A system for changing the dynamic range of an input signal to produce an output signal of altered dynamic range which corresponds to said input signal comprising, a source of input signal, means for converting said input signal into the logarithm thereof, means including filter means responsive to the output of said converting means for altering the amplitude relationship between different components of said logarithm signal, means for converting said altered logarithm signal into a signal which is the anti-logarithm thereof, said anti-logarithm signal being said output signal, and means for transmitting said output signal, said means for altering amplitude relationship causing the lower frequency component of said logarithm signal to be greater relative to the higher frequency components thereof, thereby expanding the dynamic range.

5. A system as in claim 4 and in which, said input signal consists substantially of audio frequencies.

6. A system as in claim 4 and further including a transmission system for transmitting said anti-logarithm signal whereby the transmission power level of said transmission system is relatively steady.

7. A system for changing the dynamic range of an input signal comprising, a source of input signal, means for converting said input signal into the logarithm thereof, means for altering the amplitude relationship between different frequency components of said logarithm signal, and means for converting said altered logarithms signal into a signal which is the anti-logarithm thereof, and said means for converting said input signal to the logarithm thereof, including, means for converting said input signal into a corresponding signal having amplitude excursion of magnitude proportional to the logarithm of the corresponding excursions of said input signal, and means for producing a signal indicative of the sign of said input signal excursions, and means for converting said altered logarithm signals into the anti-logarithm thereof includes, means for combining said altered frequency components, and means responsive to the output of said combining means and said signal indicative of the sign for producing said anti-logarithm signal.

8. A system as in claim 7 and in which, said input signal consists substantially of audio frequencies.

9. A transmit-receive system comprising a source of input signal, means for converting said input signal into the logarithm thereof, means for altering the amplitude relationship between different frequency components of said logarithm signal, means for converting said logarithm signal into a signal which is the anti-logarithm thereof, means for transmitting said anti-logarithm signal, means for receiving said transmitted anti-logarithm signal, means for converting said received signal into the logarithm thereof, means for altering the amplitude relationship between different frequency components of said received logarithm signal, and means for converting said altered received logarithm signal into a signal which is the anti-logarithm thereof.

10. A transmit-receive system as in claim 9 and in which, said input signal consists substantially of audio frequencies.

11. A transmit-receive system as in claim 9 and in which said means for converting said input signal into the logarithm thereof includes, means for converting said input signal into a corresponding signal having amplitude excursions of magnitude proportional to the logarithm of the corresponding excursions of said input signal and means for producing a signal indicative of the sign of said input signal excursions and said means for converting said altered logarithm signal into the anti-logarithm thereof includes means for combining said altered frequency components and means responsive to the output of said combining means and said signal indicative of the sign for producing said anti-logarithm signal.

References Cited

UNITED STATES PATENTS

| | | | |
|---|---|---|---|
| 3,214,603 | 10/1965 | Von Urff | 328—145 X |
| 2,395,758 | 2/1946 | Potter | 333—14 |

OTHER REFERENCES

Fraser et al.: An Improved High-Frequency Radio-Telephone System Featuring Constant Net Loss Operation, The Bell System Technical Journal, April 1967, pp. 683, 688, 693 relied on.

PAUL L. GENSLER, Primary Examiner

U.S. Cl. X.R.

179—1; 328—145